United States Patent [19]

Widmer

[11] Patent Number: 4,748,760
[45] Date of Patent: Jun. 7, 1988

[54] ELECTRICAL NOISE-MAKING FISHING BOBBER

[75] Inventor: Stanley W. Widmer, Browerville, Minn.

[73] Assignee: Timothy R. Thorpe, Northfield, Minn.

[21] Appl. No.: 32,314

[22] Filed: Mar. 30, 1987

[51] Int. Cl.$^4$ .............................................. A01K 93/00
[52] U.S. Cl. .................................................... 43/17
[58] Field of Search ................................. 43/17, 17.5

[56] References Cited

U.S. PATENT DOCUMENTS

| | | | |
|---|---|---|---|
| 2,153,750 | 4/1939 | Goertzen | 43/17 |
| 2,534,709 | 12/1950 | Goertzen | 43/17 |
| 2,777,238 | 1/1957 | Taylor et al. | 43/17 |
| 2,798,330 | 7/1957 | Carraway et al. | 43/17 |
| 3,739,513 | 6/1973 | Durham | 43/17 |
| 3,913,256 | 10/1975 | Morris et al. | 43/17.5 |
| 4,109,404 | 8/1978 | Preeschl | 43/17 |
| 4,437,255 | 3/1984 | Reed | 43/17 |
| 4,510,709 | 4/1985 | Melcher | 43/17 |

Primary Examiner—M. Jordan
Attorney, Agent, or Firm—Kinney & Lange

[57] ABSTRACT

A fishing bobber has a self-contained electrical circuit therein, to provide an audible noise that signals when a fish has pulled sufficiently hard on the line supported by the bobber. The line is supported on the bobber and contacts are closed to complete a circuit to a noise-making buzzer or the like when the bobber is pulled sufficiently. The case of the bobber is preferably provided with a sound outlet so that the noise is not greatly attenuated by the bobber case.

14 Claims, 4 Drawing Sheets

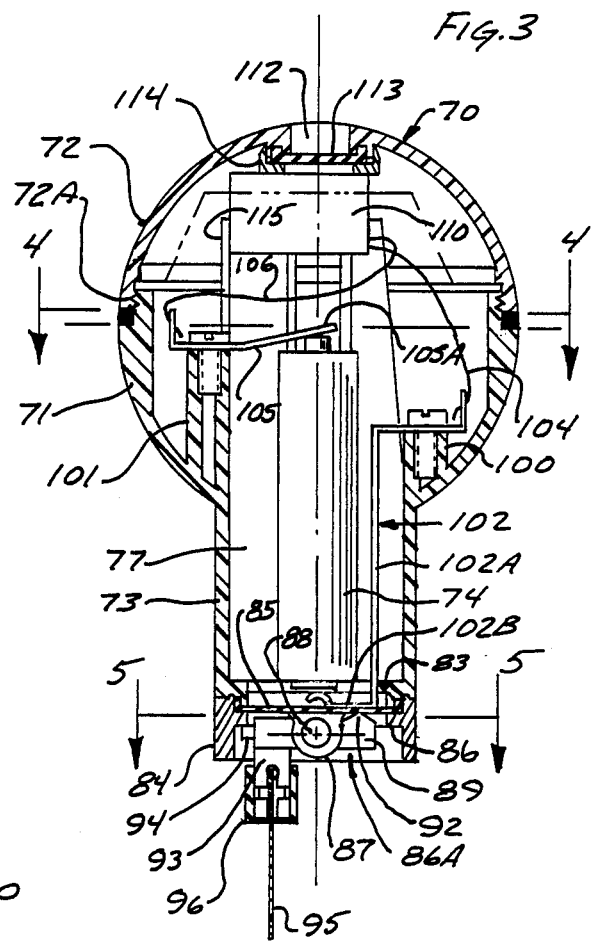
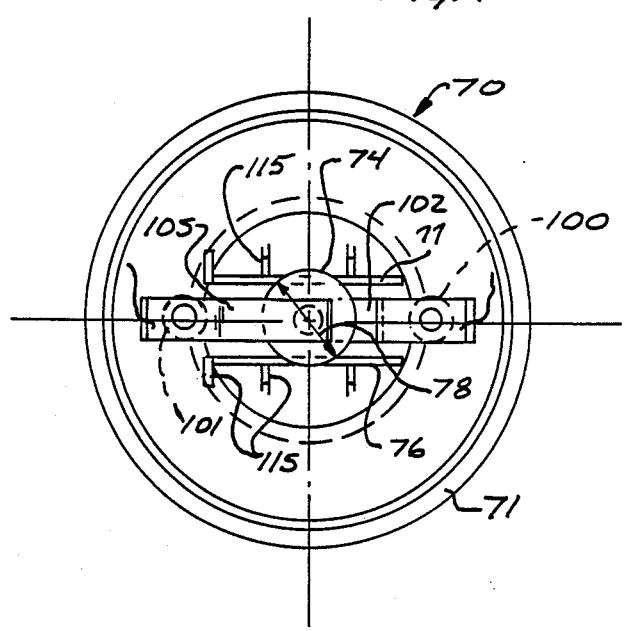
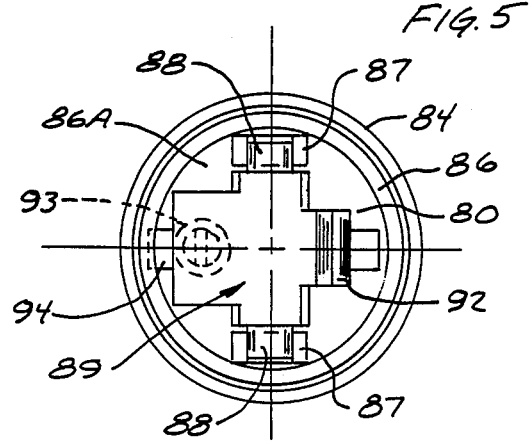

ELECTRICAL NOISE-MAKING FISHING BOBBER

BACKGROUND OF THE INVENTION

1. Field of the Invention.

The present invention relates to a fishing bobber that provides electrical signaling means, preferably a noise-maker.

2. Description of the Prior Art.

Various types of fishing bobbers have been advanced in the prior art. Lighted bobbers are known and ice fishing tip ups that provide a signal when the line is pulled have been advanced. A fishing bobber that has an alarm and is constructed to provide a high degree of passage of the noise through a provided diaphragm has been sought.

SUMMARY OF THE INVENTION

The present invention relates to a fishing bobber or float which has a self-contained electrical circuitry therein including an audible signaling device such as a noise-maker and which supports a line for a fishing hook. The line is supported so that when the line is pulled by the tug of a fish, a circuit is closed to energize the signaling device.

Various forms of the invention are shown, but all show easily molded bobbers which have batteries to provide power, and bobbers which can be made in different sizes and shapes. Additionally, the operation can be by a direct pull or through a lever arrangement that essentially comprises a pivoting cam, to provide for switch action.

In several forms of the invention, a thin diaphragm member is positioned adjacent the location of the buzzer or sound-maker so that the sound can pass easily out through a wall, but yet the diaphragm or wall maintains the interior sealed so that the bobber will not fill with water. In another form of the invention, an interior compartment is sealed for floatation and the outer housing has sufficient openings so the sound passes out easily.

Suitable seals are provided and the battery access openings can be provided in the side of the bobber case using threaded screw closures if desired.

The bobber provides a novel method of alerting a fisherman to the presence of a fish that has sufficiently tugged the supported line to cause the sound emitting circuit to close.

BRIEF DESCRIPTION OF THE DRAWINGS

FIG. 3 is a sectional view of a modified form of the fishing bobber having a sound emitting device therein;

FIG. 4 is a view taken substantially on line 4—4 in FIG. 3 to show a typical holding arrangement for supporting a battery on the interior of a bobber;

FIG. 5 is a view taken on line 5—5 to provide a top plan view of a pivoting cam used with the present invention;

DETAILED DESCRIPTION OF THE PREFERRED EMBODIMENTS

Figure 1:
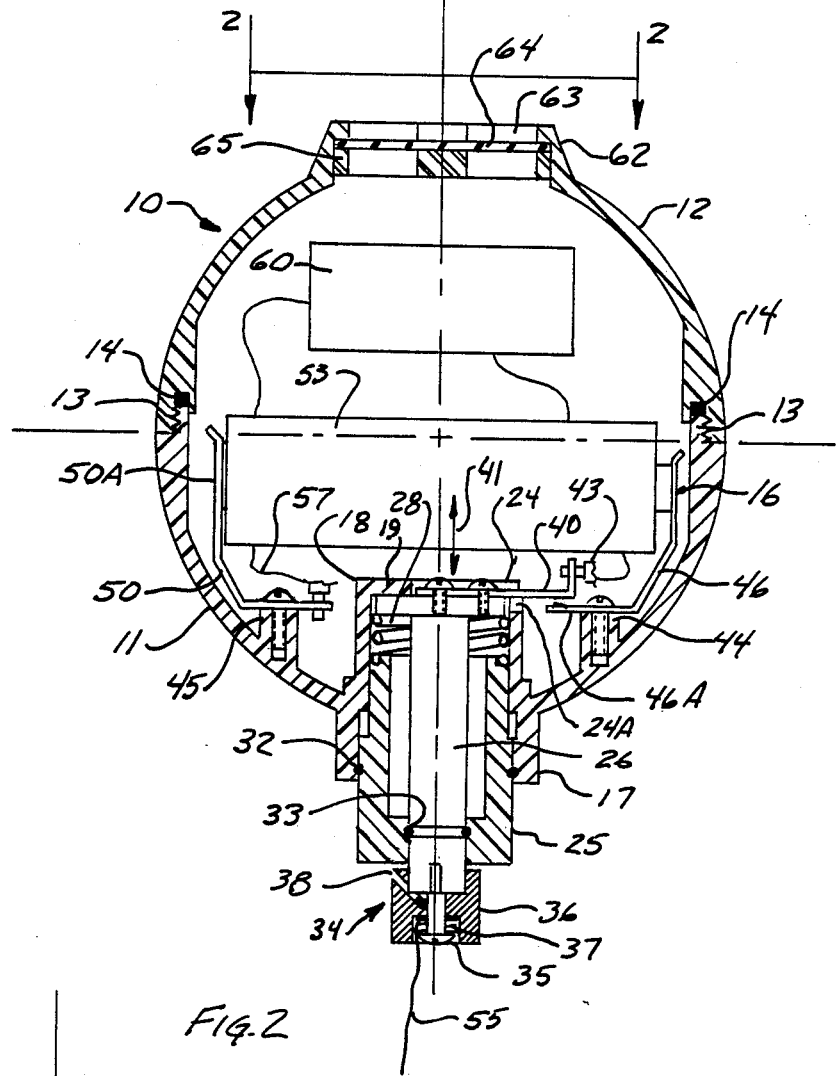
FIG. 1 is a sectional view through a typical bobber embodying the electrical signaling device of the present invention.
Figure 2:
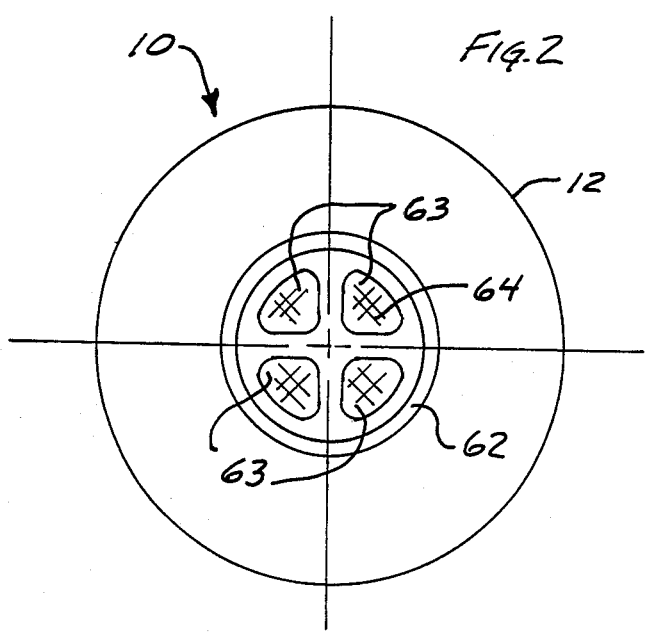
FIG. 2 is a top plan view of the device of FIG. 1.

Referring to FIGS. 1 and 2, a generally spherical fishing bobber illustrated generally at 10 made of a suitable molded plastic and is made into a lower section 11, and an upper section 12, (both half spheres) that are joined through an interfitting, telescoping joint indicated at 13. A suitable seal 14 can be used for sealing the two sections together. If desired, the joint 13 can be threaded with an O-ring seal, a friction fit joint or can be sonically welded. If friction fit, the sections can be separated for obtaining access to the interior chamber indicated generally at 16.

The lower section 11 has a lower neck 17 that is cylindrical, and which extends outwardly beyond the periphery of the spherical bobber 10. Additionally, an internal cylindrical guide 18 aligning with neck 17 is provided. The guide 18 has an end wall 19 that is generally perpendicular to a central axis 23 of the bobber, which comprises the upright axis when the bobber is floating in water.

This cylindrical member 18 comprises a housing for guiding a switch assembly. The end wall 19 has a radial slot 24 defined therein, and the slot 24 has an extension 24A that extends down from end wall 19 into the wall of the cylindrical member 18.

A switch guide assembly 25 is mounted in the housing 18 and neck 17 and slidably guides a sliding plunger 26 on the interior thereof. The plunger 26 has a head member 27 that is urged against the wall 19 by a spring 28 provided between the end of the guide 25 and the head member 27. The guide 25 is inserted into the neck 17 and the housing 18, and is held by suitable friction from an O-ring 32 acting against the interior wall of the neck 17.

Spring 28 biases the head 27 up against the end wall 19, under normal circumstances, but the plunger or shank 26 is made so that it will slide in its provided opening in the guide 25 even though there is a light (low friction) seal 33 surrounding the shank 26 where it passes through the end wall of the guide 25, as well. The spring 28 is a very light spring but will operate to keep the shank 26 urged upwardly.

A line retainer assembly indicated generally at 34 is attached to the lower end of shank 26. The line retainer can be any desired device, but as shown a small shoulder screw 35 is threaded into the end of the shank 26 and has a spring on the shank of the screw between the screw head and the interior of a counter-bore in a line release sleeve 36. Spring 37 acts to push the line release sleeve upwardly against the end of the shank 26 under normal conditions, but the sleeve 36 can be pulled downwardly away from the shank 26 so that a slot indicated at 38 is exposed to permit a fishing line 55 to be inserted after which the sleeve 36 can be released and the fishing line 55 will be pushed up against the end of the shank 26 and held securely.

The line retainer assembly 34 can be any desired type and merely has to hold a fishing line in place.

Head member 27, which is also cylindrical in plan view, carries a movable switch contact member 40 thereon and the switch contact member extends outwardly through the slot portions 24 and 24A. The switch contact 40 is held onto the head 27 with suitable screws as shown, and can move up and down generally as indicated by the arrow 41 a limited amount as permitted by the slot portion 24A. A suitable lead illustrated generally at 43 is suitably connected to an end portion of switch contact 40.

As shown, the lower section 11 of the bobber has a pair of internal bosses 44 and 45, respectively, molded therein and these bosses are bored so that they will receive screws for holding battery holder clips in place. The boss 44, for example, has a screw that holds an end clip 46 in place. The clip 46 is made of a suitable spring brass, and has an end portion 46A that aligns with and is in registry with an end portion of the switch contact 40. The upper end of the clip 46 extends vertically up toward the center line of the bobber and provides a resilient force that resists bending.

The second boss 45 has a screw therein which supports a second spring clip member 50 that has a portion 50A that extends upwardly to engage the bottom of a battery (for example, a AA size battery) indicated generally at 53. Battery 53 has an opposite end which engages the portion 44A of the first spring clip and the battery is held in place between these clips.

It can be seen that when the shank 26 is pulled downwardly because of a tug on the fish line 55, an end portion of the switch contact 40 will contact the end portion 46A and will complete a circuit. The member 50, in turn, has a wire 57 thereon, which is connected to a suitable sound emitting device such as a buzzer indicated generally at 60. The wire 43 also is connected to the buzzer 60 so when the switch formed by members 40 and 46A close, the buzzer will sound off. The buzzer 60 will be made so that it is of low power consumption, but permits a sharp piercing or other recognizable sound. This buzzer 60 is shown schematically only, but can be suitably supported, even by adhesives, adjacent an upper end neck 62 of the upper bobber section 12. The neck 62 as shown in FIG. 2 has openings 63 therein, and a rubber or flexible diaphragm 64 is provided on the interior and is held in place with a suitable support ring 65 that frictionally fits on the inside of the neck 62. The diaphragm 64 is thin, so that it will permit sound from the buzzer 60 to pass through easily, and thus makes the buzzer more easily heard.

When fishing, the bobber would be floating in water, for example, approximately along its midpoint, and the top portion (neck 62) would be protruding out of the water. If a fish grabs the line 55, the shank 26 is pulled down, against the action of the relatively light spring 28, and contacts would close that are formed between the switch contact 40 and the end portion 46A to complete the circuit through the wires 43 and 57 to the buzzer 60, and thus through the battery 53 as well to power the buzzer.

The unit, as can be seen, is attractive and it can be made in the same color as conventional bobbers, but provides the addition of the audible signal through a self-contained electrical circuit on the inside of the bobber.

The concept of having a self-contained electrical circuitry with contact means that is responsive to force on the line can be shown in different embodiments, for example, in FIGS. 3, 4 and 5 a bobber 70 is also generally spherical, and has a different orientation of the battery for the electrical circuit and different actuating mechanism. The bobber 70 includes a base, half-sphere section 71 and an upper half-sphere section 72. The base section 71 has an elongated neck 73 protruding therefrom, and extending downwardly when the bobber is supported in the water. Neck 73 is a cylindrical wall that surrounds a battery indicated generally at 74. The neck 73, as can be seen in FIG. 4, is provided with parallel walls 76 and 77 (only 77 is shown in FIG. 3) and these walls are suitably molded in place in the lower portion of the neck. The walls 76 extend upwardly from the junction between the lower and upper sections 71 and 72 of the bobber into the space encompassed by the upper section. The walls 76 and 77 are provided with a recess that is shown by the diameter dimension 78 (FIG. 4), to provide openings in both walls and to separate each of the walls into two sections to permit a battery 74 to fit in the opening, also as shown in FIG. 4. The wall sections provide a friction grip on the battery 74, so that the battery can be slipped into place and held securely within the neck 73.

In this form of the invention, the lower end of the neck 73 has an internal shoulder ring indicated generally at 83 that is positioned to receive an end support ring 84 which is used to clamp a flexible diaphragm 85 across the open bottom of neck 73 and seal the interior of the neck 73 from the exterior. The ring 84 is of suitable plastic material so that it will frictionally hold the diaphram 85 in place.

As can be seen in FIG. 5 as well as in FIG. 3, the ring has an internal flange 86 that defines a central cylindrical opening 86A, and also has molded-in half cylindrical pivot bushing supports 87 on opposite sides of opening 86. Only one of the cylindrical supports 87 is shown in FIG. 3 and the other is diametrically opposed, as can be seen in FIG. 5.

These pivot supports 87, which are upwardly opening half-cylindrical members, are made to support a supporting pair of ears 88,88 on opposite sides of a pivoting cam 89 that pivots in bushings 87 about an axis that extends transversely across the neck 73 of the bobber.

The cam 89 has an actuator lug 92 at one end thereof, and a depending line holding shank 93 at the other end. A stop member 94 is provided at the end having the line holding shank 93. The stop member 94 abuts against the rim 86.

The diaphragm 85 is resilient and provides a spring load that will hold the cam lug 92 downwardly, and the stop 94 up against the rim as shown in FIG. 3.

The line holding shank 93 has a hole through which the line can be threaded, and a series of grooves in it around which a fishing line can then be wrapped, and then a rubber sleeve 96 can be slipped over the shank 93 to surround these grooves so that the line 95 will be retained in position and held so that it extends downwardly. The other end of the line would be attached to a fishing pole or rod.

The lower bobber section 71 has a pair of bosses or screw holding sleeves 100 and 101 molded therein (see FIG. 4, as well) and the sleeve 110 has a screw therein that supports a first spring contact member 102 that is made of suitable conductive material and has a long shank portion 102A that extends downwardly through the neck 73. The contact member 102 has a contact and switch portion 102B that aligns with one end of the battery 74, and actually rests on the diaphragm 85 under a slight spring load, as can be seen. The other end of the contact member 102 is connected to a wire or lead 104.

The sleeve 101 has a screw threaded therein to support a spring contact member 105 that is spring loaded through a portion 105A against the end of the battery 74 opposite from the end adjacent contact-switch portion 102B. A wire 106 is attached to an opposite end of the contact member 105. The wires 104 and 106 are connected to a noise maker or sound emitter indicated generally at 110 that is suitably supported on the upper ends (as shown) of the walls 76 and 77, and which may be clamped in place when an upper bobber section 72 is placed on a lower bobber section 73 and aligned at the threaded connectors or threaded with an O-ring seal 72A. As can be seen, the upper bobber section 72 has an opening 112 at its upper end, and this opening is covered with a diaphragm 113 that is held in place with a suitable cap 114 that also has a central opening. The cap 114 is welded or bonded in place and may rest against the sound emitter 110 and hold it in place between small ears 115 that are at the upper ends of the walls 76 and 77. The ends 115 are positioned so that when the two bobber sections are placed together, the sound emitter 110 will be supported properly, and the thin diaphragm 113 will be adjacent the sound emitter so that noise can pass out through the opening 112 and the opening in the collar or retainer 114 easily.

The pivoting cam assembly 89 is mounted so that when the line 95 is pulled downwardly as shown in FIG. 3, the cam actuator end 92 will move upwardly against the diaphragm 85 and the switch-contact end portion 102B of the contact member 102. The cam causes the portion 102B to contact the end of battery 74 that is adjacent the contact member 102B and complete a circuit to the noise maker 110 which emits a sound. The amount of force necessary to close the contact can be quite light, and is controlled in part by the springiness of the contact member 102 and the diaphragm 85. The diaphragm 85 keeps the interior of the bobber waterproof, or watertight, but does not interfere substantially with movement of the cam or the contact members.

The cam assembly 89 can be placed 180° from the position shown so the cam actuator end 92 would be on the left side of the pivot shown in FIG. 3. The contact 102B would be made longer and doubled back to the central axis if desired.

The same action occurs as in the first form of the invention, namely, when line 95 is pulled the sound emitter will go off from a self-contained electrical circuit. The bobber, of course, will act as a normal bobber would.

Figure 6:
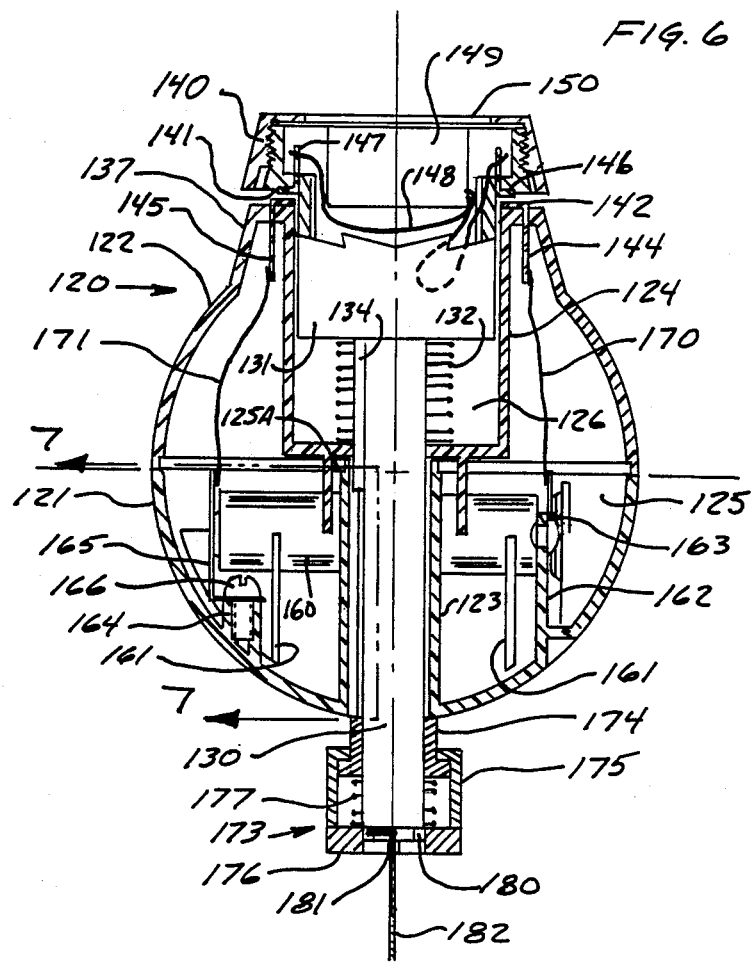
FIG. 6 is a sectional view through a further modified form of the present invention.

In FIG. 6, a further modified form of the invention is illustrated, wherein a bobber indicated generally at 120 is shown to have a lower bobber section 121 and an upper bobber section 122. The lower section 121 has a cylindrical sleeve 123 formed in the center thereof, and the sleeve defines a central passageway up through the half-sphere section 121. The upper bobber section 122 in this form of the invention has an interfitting periphery with the lower section 121, as shown. The upper bobber section also has a cylindrical, integrally molded housing 124 therein, and the sleeve 123 in the housing 125 mates with housing 124 along a junction 125A. When assembled, the junction 125A may be suitably sonically welded or otherwise sealed together there so that the interior chamber 126 of the housing 124 and the interior passageway of the sleeve 123 are sealed from the rest of the interior chamber indicated at 125 in the bobber.

This removes the need for placing O-rings around the sliding elements for operating the contacts, as will be explained.

In this form of the invention, an actuator plunger 130 is slidably mounted in the sleeve 123 and extends up into the chamber 126. The plunger 130 has a head member 131 at its upper end, which is urged upwardly by a spring 132 acting on the underside of the head member 131 and against the lower wall defining the chamber 126. It should be noted that the shank 130 can have a small key-like radially extending guide 134 thereon which fits into a complementary shaped receptacle in the opening in the lower wall of chamber 126 to prevent the shank 130 from rotating, but permitting the shank to slide axially up and down.

The head member 131 extends into the interior of a neck portion 137 formed at the top of the upper section 122. A cap member 140 is threadably mounted on the upper end of the head 131 on the exterior of the upper bobber section. The head 131 has an outwardly extending flange or shoulder shown at 141 that mates with an upwardly facing shoulder or flange 142 of the upper section 122 of the bobber. The shoulder 142 mounted thereon has a pair of contacts 144 and 145, respectively. These contacts are electrically isolated from each other on diametrically opposed sides of the shoulder or flange 142. The head member 135 also has a pair of contacts indicated at 146 and 147, respectively thereon, on the shoulder or flange 141, which are individually connected through suitable wires 148 to a noise maker 149. The noise maker can be suitably supported on the head member 131. The member 140 has a through opening 150 that aligns with an opening in head member 131. The opening 150 does not have to be covered because it is isolated or sealed from the interior chamber 125 of the bobber that causes the bobber to float.

Figure 7:
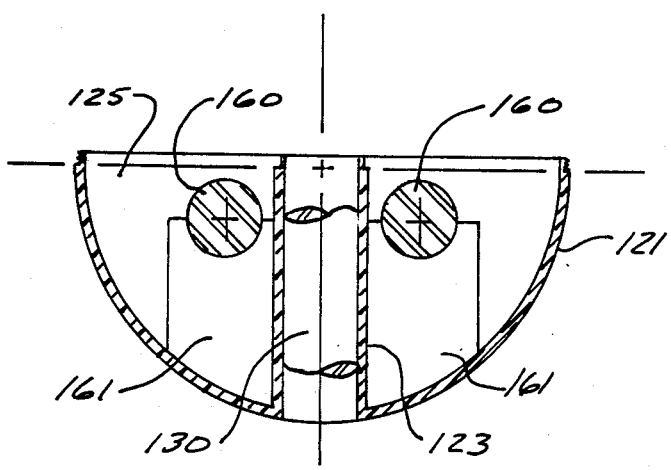
FIG. 7 is a fragmentary sectional view taken generally along line 7—7 in FIG. 6.

Power is provided in this form of the invention with two batteries indicated generally at 160, and in FIG. 7 the second battery can be seen. These batteries are suitably supported side-by-side on support members 161 that are molded in the lower section 121 of the bobber, and are positioned on opposite sides of the sleeve 23. The batteries are changed by unscrewing two plugs that have O-ring seals.

A wall 162 molded in the lower bobber section 121 carries a pair of suitable spring contacts such as that shown at 163 thereon, which are aligned with the batteries, and when the batteries are rested in their supports 161, the ends of the batteries will contact a separate one of these contacts 163. The contacts 163 are connected in parallel. Likewise, a spring contact 165 is mounted with suitable screws 166 to molded-in bosses 164 in the lower section 121 of the bobber, and the spring contact 165 can span both of the batteries so that the ends of the batteries are supported under a spring load against the contacts 163 supported by the wall 162. The contacts 163 are connected with a suitable wire 170 to the contact 144, and contacts 163 are connected with a suitable wire 171 to the contact 145. Thus, a circuit is provided, so that when the cap member 140 pulls downwardly and the contacts 146 and 147 contact the contacts 144 and 145, respectively, the circuit will be completed through the wires 148 to the noise maker 149. This will cause the noise maker to make a noise that can be heard by a fisher.

The fishing line is attached with a fishing line attachment device shown generally at 173 that can be of any desired form, but which includes a sleeve 174 on the shank 130 that provides a stop sleeve against the bottom edge of the bobber section 121. The sleeve 174 is fixed onto the shank 130 adjacent its lower end on the exterior of the bobber. Sleeve 174 has a head or flange slidably inside a housing 175 that has an end wall 176. A spring 177 is provided for urging the wall 176 away from the head on the member 174.

The end of the shank 130 has an annular groove indicated at 180. The groove 180 is spaced upwardly from the bottom of the shank and there are a plurality of axial slots such as that shown at 181 through which the line can drop. By pulling the housing 175 up against the action spring 177, it will expose the groove 180, and the fishing line can be wrapped in the groove 180 and then dropped through one of the slots 181 so that the line 182 extends downwardly as shown. Then, the sleeve 175 can be released to lock the line in place.

Of course, again, any type of line holding device can be used, but it can be seen that once the line 182 receives a pull from a fish, the shank 130 will slide, compressing the spring 132 (which is a very light spring), causing the cap member 140 to be pulled downwardly and completing the circuit to the noise maker 149 through the contacts 144, 145, 146 and 147.

The bobber section can be made in one piece to the extend needed, or can be made of individual parts that are glued or welded together by sonic welding.

Figure 8:
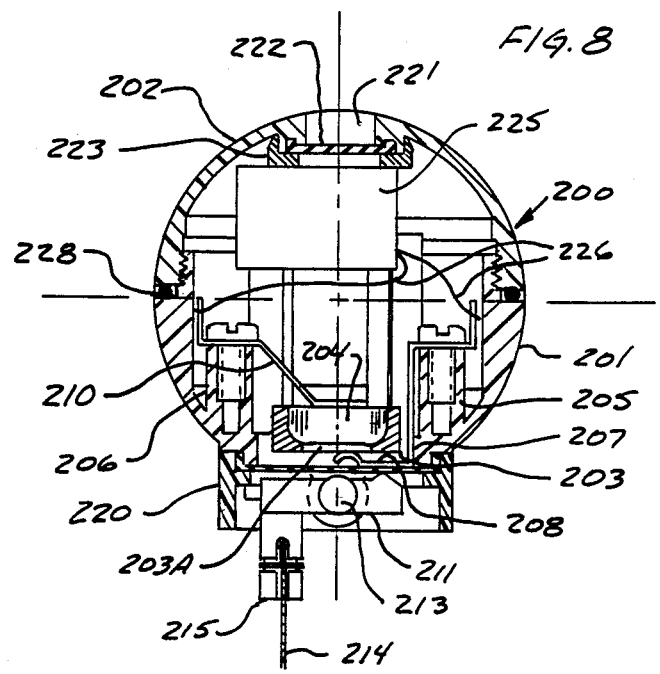
FIG. 8 is a modified form of the invention using a different type of a battery, and providing a more compact size for obtaining the signaling features of the present invention.

FIG. 8 shows a further modified form of the invention wherein a small hearing aid battery can be used, and as shown, a bobber 200 has a lower section 201 and an upper section 202. The lower section has a battery support 203 molded therein, to hold a small hearing aid battery shown at 204.

The lower bobber section here also has sleeves or bosses 205 and 206 molded therein that hold screws to support spring contact members. For example, the sleeve 205 has a contact member 207 mounted thereon. The contact member 207 extends downwardly and has a laterally extending portion 208 that is aligned with an opening 203A in the battery support 203. The sleeve 206 supports a contact 210 that bears directly against the battery 204 and holds it in place in the battery holder.

A pivoting cam assembly indicated generally at 211 is provided, and has a cam actuator that operates against a diaphragm 212, and which pivots on suitable pivot pins 213 about a transverse axis. A fishing line 214 is supported in a line holder 215. A diaphragm 216 is held in place in a neck portion of the lower bobber section 201 with a retaining ring or holding ring 220 that frictionally fits into the neck portion.

The upper section 202 of the bobber 200 has an opening 221 in the top center, which is covered with a diaphragm 222. The diaphragm 222 is held in place with a retainer ring 223 on the interior of the upper bobber section.

The upper section 202 of the bobber also supports a noise maker 225 which is connected with suitable wires 226 to the respective contacts 207 and 210, so that when the line 214 is pulled, the cam assembly 211 will pivot on pins 213 and the cam actuator end will push against the contact portion 208 and complete a circuit to the battery 204 and thus through the contacts to the noise maker 225. Again, an opening that does not substantially restrict sound emission is provided in the top portion 202 of the bobber.

In this form of the invention, the cam assembly 211 also can be reversed so the actuator line is on the left side of FIG. 8 and a longer contact 208 is provided for actuation.

The two bobber sections can be held together, as in the previous forms of the invention, by threads or with telescoping friction members, and the sections can be sealed with a suitable sealing ring 228 if desired.

Figure 9:
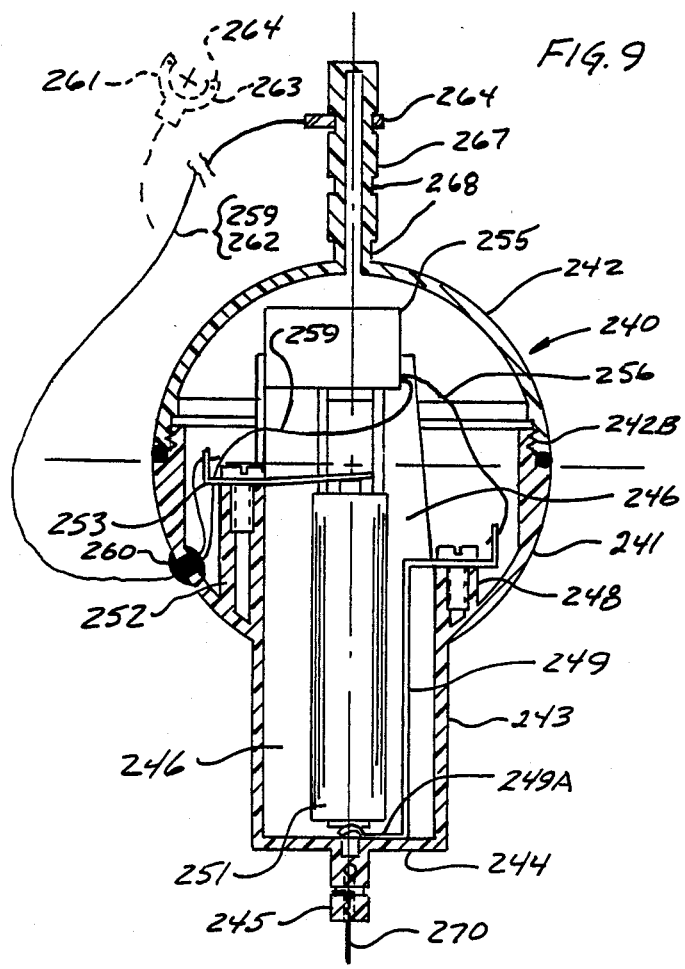
FIG. 9 is a further modified form of the invention having an external actuator.

In FIG. 9, a further modified form of the invention is shown, wherein a bobber 240 has a lower section 241 and an upper section 242 that are threaded together at a junction area 242A, which is sealed with an O-ring.

The lower section 241 has a sleeve-like neck 243 that has a closed bottom wall 244 that supports a line support neck 245. The interior of the lower section 241 has battery support walls 246 that are similar to that shown at 76 and 77 in the form of the invention shown in FIG. 3. A boss member or sleeve 248 is molded in place and receives a screw that holds a contact member 249 that extends downwardly to the bottom wall 244 and has a laterally extending portion 249A. A battery 251 that is supported on the walls 246 rests against this contact portion 249A and makes electrical contact therewith.

A second sleeve or boss 252 is molded in the lower bobber section 241 and a screw is threaded into the boss to hold a spring loaded contact 253 that bears against the upper end of the battery 251 and holds it in place.

A noise maker 255 is supported on the walls 246 and has one lead 256 that is connected to the contact 249, and another lead 259 that extends outwardly through a provided, sealable grommet 260 to one-half or one leg 261 of a U-shaped connector 264. A lead 262 is connected to the interior contact 253 and also passes through the grommet 260, and is connected to the second leg 263 of the slip-on connector at 264. The legs 261 and 263 are electrically isolated from each other. As can be seen, the upper section 242 of the bobber 240 has a long neck 267 thereon which has grooves 268 therein that are of size to receive the connector assembly 264 so it stays in place or is otherwise held by friction. The connector assembly 264 is shown in dotted lines in best detail, and is shown in position in a groove 268 in solid lines.

In this form of the invention, when the bobber is pulled down by a line indicated at 270 supported on a line holder 251 in a suitable manner, the bobber is small enough so that it will be pulled under the water, and the conductivity of the water will cause the contacts 261 and 263 to be electrically connected to complete a circuit to the noise maker 255.

Most water has enough conductivity to provide this type of conduction for completing the circuit to the noise maker 255.

This form of the invention eliminates the need for switch contacts, and depends only on water conductivity when the bobber is pulled completely below the water when a fish bites or strikes.

If desired, the leads 262 and 259 can be connected to individual slip-on contacts mounted on neck 267 so that the water would have to provide the conduction between two separate slip-on contacts in order to complete the circuit. The neck 267 has different grooves to hold the slip-on connector at different levels so the amount the bobber has to be submerged to be activated can be adjusted.

If desired, the member 242 can be provided with an opening therein which would have a diaphram over it to insure that the noise is adequately transmitted through the wall of the bobber so that it can be heard by the fisher.

In all forms of the invention, the electrical signaling means is provided to provide an audible noise. Also, the batteries are positioned to provide ballast to the bobber so the bobber floats in a desired orientation.

Although the present invention has been described with reference to preferred embodiments, workers skilled in the art will recognize that changes may be made in form and detail without departing from the spirit and scope of the invention.

What is claimed is:

1. A signalling fish bobber comprising:
a floatable member defining an interior chamber;
means for attaching a fishing line to said floatable member;
electrical circuit means carried entirely on said floatable member and including a noise maker for making a sound supported in the interior chamber; and
said electrical circuit means including contact means moved physically by movement of a line carried by said floatable member for completing an electrical circuit to said signalling means when a fishing line attached to the means for attaching has been pulled a desired amount.

2. The apparatus as specified in claim 1 wherein said means responsive comprises a pair of metal contacts non-movably mounted on the exterior of the bobber, which are submerged when a line attached to the means for attaching is pulled with a sufficient force to complete a circuit through water in which the floatable member is supported and submerged.

3. The apparatus of claim 2 wherein the floatable member has a neck at an opposite side thereof from the means to attach a line, said circuit means including components having sufficient weight so the neck remains upright and out of the water when the floatable member is floating and means for retaining the metal contacts at selected axial spaced locations on the neck.

4. The apparatus of claim 3 wherein the neck has a plurality of more than two means for retaining so that the level at which both contacts are submerged can be changed.

5. The apparatus as specified in claim 1 including battery means mounted within said floating member, and contacting means for contacting said battery means to complete a circuit, said battery means providing a ballast to maintain the floating member at a desired orientation.

6. The apparatus as specified in claim 1 wherein said means responsive for completing a circuit comprises a pivoting cam member, said cam member having an actuator end which moves when the cam is pivoted and said cam having means for attaching a fishing line thereto; and
a movable contact mounted adjacent the cam actuator end and forming part of the electrical circuit means; said cam actuator end acting against the movable contact to complete a circuit to the signalling means when the cam is pivoted by load on a fishing line attached to the means for attaching.

7. The apparatus as specified in claim 6 and a thin, flexible diaphragm wall sealing the interior chamber of said floatable member from the exterior and being positioned between and separating said actuator end of the cam and said movable contact whereby the cam deflects the flexible diaphragm when it acts against the movable contact.

8. A signalling fish bobber comprising:
a floatable member comprising a wall forming a substantial portion of the floatable member;
means for attaching a fishing line to said floatable member;
electrical circuit means carried entirely on said floatable member and including a signalling means comprising a noise maker for making a sound on the interior of the floatable member;
said electrical circuit means including means responsive to movement of a line carried by said floatable member for completing an electrical circuit to said signalling means to cause emmission of a sound when a fishing line attached to the means for attaching has been pulled a desired amount; and
said wall having an opening therethrough adjacent the signalling means and said sealing opening having greater sound transmission properties than the material forming the wall of the floatable member.

9. The apparatus as specified in claim 8 wherein said opening comprises an uncovered opening adjacent said noise maker, and wherein said noise maker is fluidly isolated from a chamber formed in the floatable member that permits the floatable member to float.

10. The apparatus as specified in claim 8 wherein said opening is covered by a thin, flexible diaphragm to provide sealing of an interior chamber formed in said floatable member by said wall while permitting sounds to be transmitted more readily therethrough than through the wall of the floatable member.

11. A fishing bobber comprising a generally spherical shaped assembly having upper and lower sections defining an interior chamber, said lower section having a neck extending therefrom;
a battery mounted in said lower section and carried thereby, said upper section being sealingly attached to said lower section to enclose the interior chamber;
contact means connected to opposite ends of said battery;
a switch member, said switch member being movable and means to bias the switch member to an open position;
means for attaching a fishing line to said bobber, said means for attaching including a movable element operably associated with said switch member so that upon movement of said fishing line under a preselected force, the switch member will be moved to a closed position; and
a signalling means comprising a noise maker within the interior chamber operably associated with said contacts and the switch member so that upon closing of said switch member said signalling means is activated.

12. The apparatus as specified in claim 11 wherein said means holding said fishing line comprises a pivoting cam, said cam having an actuator portion that moves said switch member to its closed position when the line is under load.

13. The apparatus as specified in claim 12 wherein said switch member is on the inside of the bobber, and said cam is on the outside, and a flexible diaphragm separating the cam from the switch member, said flexible diaphragm providing a resilient force tending to urge said cam to a position wherein the switch contact is open.

14. A fishing bobber comprising a generally spherical shaped assembly having upper and lower sections defining an interior chamber, said lower section having a neck extending therefrom;

a battery mounted in said lower section and carried thereby, said upper section being sealingly attached to said lower section to enclose the interior chamber;

contact means connected to opposite ends of said battery;

a switch member, said switch member being movable;

means for attaching a fishing line to said bobber, said means for attaching including a movable element operably associated with said switch member so that upon movement of said fishing line under a preselected force, the switch member will be moved to a closed position;

a signalling means comprising a noise maker within the interior chamber operably associated with said contacts and the switch contact member so that upon closing of said switch member said signalling means is activated; and an opening defined through a wall of the bobber adjacent said noise maker, a flexible membrane sealing said opening, said membrane being of greater sound transmission characteristics than the rest of the walls of the bobber which define the interior chamber.

* * * * *